United States Patent
Frevert et al.

(10) Patent No.: US 12,055,442 B2
(45) Date of Patent: Aug. 6, 2024

(54) SYSTEMS AND METHODS FOR INFRARED SENSING

(71) Applicant: Waymo LLC, Mountain View, CA (US)

(72) Inventors: Benjamin Frevert, Mountain View, CA (US); Zachary Morriss, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 262 days.

(21) Appl. No.: 17/754,930

(22) PCT Filed: Oct. 16, 2019

(86) PCT No.: PCT/US2019/056515
§ 371 (c)(1),
(2) Date: Apr. 15, 2022

(87) PCT Pub. No.: WO2021/076121
PCT Pub. Date: Apr. 22, 2021

(65) Prior Publication Data
US 2023/0094677 A1    Mar. 30, 2023

(51) Int. Cl.
  *G01J 5/59* (2022.01)
  *G01J 4/00* (2006.01)
  *G01J 5/00* (2022.01)

(52) U.S. Cl.
CPC .  *G01J 5/59* (2022.01); *G01J 4/00* (2013.01); *G01J 5/0025* (2013.01); *G01J 2005/0077* (2013.01)

(58) Field of Classification Search
CPC .... G01J 5/59; G01J 4/00; G01J 5/0025; G01J 2005/0077; G01J 4/02; G01J 5/047; G06V 20/56; G06V 20/58; G01S 17/931
See application file for complete search history.

(56) References Cited

U.S. PATENT DOCUMENTS

| 2010/0045984 A1 | 2/2010 | Brochard et al. |
| 2012/0147187 A1 | 6/2012 | Li et al. |

(Continued)

FOREIGN PATENT DOCUMENTS

| EP | 2136198 A1 * | 12/2009 | ............ B82Y 20/00 |
| JP | 2005043240 | 2/2005 | |

(Continued)

OTHER PUBLICATIONS

Japanese Patent Office, Office Action mailed on Mar. 7, 2023, issued in connection with Japanese Patent Application No. 2022-518655, 15 pages (with English translation).

(Continued)

*Primary Examiner* — Christine S. Kim
(74) *Attorney, Agent, or Firm* — McDonnell Boehnen Hulbert & Berghoff LLP (57) ABSTRACT

The present disclosure relates to systems, vehicles, and methods relating to imaging and object detection using polarization-based detection of infrared light. An example system includes at least one infrared detector configured to detect infrared light corresponding to a target object within a field of view. The infrared light includes at least one of a first polarization or a second polarization. The system also includes a controller configured to carry out operations. The operations include receiving, from the at least one infrared detector, information indicative of infrared light corresponding to the target object. The operations also include determining, based on the received information, a polarization ratio corresponding to the target object. The polarization ratio comprises a first polarization intensity divided by a second polarization intensity. The operations also include determining, based on the polarization ratio, that the infrared light corresponding to the target object comprises direct light or reflected light.

20 Claims, 10 Drawing Sheets

(56) References Cited

U.S. PATENT DOCUMENTS

| | | | |
|---|---|---|---|
| 2013/0188051 A1* | 7/2013 | Ishigaki | G06T 5/40 |
| | | | 348/148 |
| 2013/0335741 A1 | 12/2013 | Hall et al. | |
| 2014/0184800 A1 | 7/2014 | Hirai et al. | |
| 2015/0035110 A1 | 2/2015 | Pisano et al. | |
| 2018/0268246 A1 | 9/2018 | Kondo et al. | |
| 2019/0014271 A1* | 1/2019 | Itoh | A61B 5/1171 |
| 2020/0247307 A1 | 8/2020 | Tsutsumi | |
| 2022/0206154 A1* | 6/2022 | Kotov | G01S 7/4802 |

FOREIGN PATENT DOCUMENTS

| | | | |
|---|---|---|---|
| JP | 2012117872 | | 6/2012 |
| JP | 2013029451 A * | | 2/2013 ............ B60S 1/0844 |
| JP | 2018084536 | | 5/2018 |
| JP | 2018151277 | | 9/2018 |
| KR | 10-2011-0117719 | | 10/2011 |
| KR | 10-2018-0061410 A | | 6/2018 |
| WO | 2017/056821 | | 4/2017 |
| WO | 2018/184913 | | 10/2018 |
| WO | 2019/059026 | | 3/2019 |
| WO | WO-2022196109 A1 * | | 9/2022 |

OTHER PUBLICATIONS

Ogawa et al., "Wavelength- or Polarization-Selective Thermal Infrared Detectors for Multi-Color or Polarimetric Imaging Using Plasmonics and Metamaterials," Materials, May 4, 2017, vol. 10, No. 5, Article 493, 16 pages.

International Searching Authority, International Search Report and Written Opinion mailed on Jul. 15, 2020, issued in connection with International Patent Application No. PCT/US2019/056515, filed Oct. 16, 2019, 11 pages.

Japanese Patent Office, Notice of Reasons for Rejection mailed on Jun. 15, 2023, issued in connection with Japanese Patent Application No. 2022-518655, 9 pages (with English translation).

European Patent Office, Extended European Search Report mailed on Apr. 28, 2023, issued in connection with European Patent Application No. 19948971.7, 8 pages.

Piccardi et al., "A Sensor for the Optical Detection of Dangerous Road Condition," Proceedings of the 7th International Conference on Photonics, Optics and Laser Technology, Feb. 25, 2019, pp. 283-288.

* cited by examiner

Figure 3B $$\frac{\text{First Polarization Intensity } 132}{\text{Second Polarization Intensity } 134} = \text{Polarization Ratio } 410$$

400

Direct Light Polarization Range 420 = { 0.4 ≤ Polarization Ratio 410 ≤ 0.6 }

Reflected Light Polarization Range 430 = { Polarization Ratio 410 < 0.4 and Polarization Ratio 410 > 0.6 }

SYSTEMS AND METHODS FOR INFRARED SENSING

CROSS REFERENCE TO RELATED APPLICATION

The present application is a national stage entry of PCT/US2019/056515 filed on Oct. 16, 2019, the contents of which are hereby incorporated by reference.

BACKGROUND

Infrared detectors (e.g., thermal detectors and infrared photodetectors) are sensitive to incident infrared radiation. For example, infrared detectors can provide a photocurrent or photovoltage in response to incident infrared light.

SUMMARY

The present disclosure relates to systems, vehicles, and methods relating to imaging and object detection using polarization-based detection of infrared light.

In a first aspect, a system is provided. The system includes at least one infrared detector that is configured to detect infrared light corresponding to a target object within a field of view. The field of view includes an environment of the system. The infrared light includes at least one of a first polarization or a second polarization. The system includes a controller having at least one processor and at least one memory. The at least one processor executes instructions stored in the at least one memory so as to carry out operations. The operations include receiving, from the at least one infrared detector, information indicative of infrared light corresponding to the target object. The operations also include determining, based on the received information, a polarization ratio corresponding to the target object. The operations additionally include determining, based on the polarization ratio, that the infrared light corresponding to the target object comprises direct light or reflected light.

In a second aspect, a vehicle is provided. The vehicle includes at least one infrared detector that is configured to detect infrared light corresponding to a target object within a field of view. The field of view includes an environment of the vehicle. The infrared light includes at least one of a first polarization or a second polarization. The vehicle also includes a controller having at least one processor and at least one memory. The at least one processor executes instructions stored in the at least one memory so as to carry out operations. The operations include receiving, from the at least one infrared detector, information indicative of infrared light corresponding to the target object. The operations also include determining, based on the received information, a polarization ratio corresponding to the target object. The operations additionally include determining, based on the polarization ratio, that the infrared light corresponding to the target object includes direct light or reflected light.

In a third aspect, a method is provided. The method includes receiving, from at least one infrared detector, information indicative of infrared light corresponding to a target object. The infrared light includes at least one of a first polarization or a second polarization. The method also includes determining, based on the received information, a polarization ratio corresponding to the target object. The method additionally includes determining, based on the polarization ratio, that the infrared light corresponding to the target object includes direct light or reflected light.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Objects in thermal equilibrium emit electromagnetic radiation, which has a spectrum and intensity that is based on the objects' temperature. Moving objects (e.g., pedestrians and vehicles) emit infrared blackbody radiation that can typically be distinguished from that of ambient background, because such moving objects are usually warmer than the surrounding environment. Infrared sensors, such as long-wave infrared (LWIR) imagers, can be utilized to detect such heat signatures. In some examples, infrared image sensors can detect LWIR light emitted from pedestrians, vehicles, or other objects warmer than the ambient environment.

Compared to light in the visible spectrum, light in the LWIR (e.g., light with wavelengths between 8-12 μm) is often more readily reflected off common surface materials (e.g., metal, plastic, glass, etc.). Accordingly, in some scenarios, infrared sensors can detect reflected LWIR light from objects that are obscured or otherwise outside the field of view of other types of sensors, including imaging sensors (e.g., visible spectrum cameras) and/or time-of-flight depth sensors (e.g., LIDAR).

In the present disclosure, a microelectromechanical system (MEMS)-style infrared sensor could be utilized to detect blackbody radiation of objects in an environment. The infrared sensor could be sensitive to one or more linear polarizations (e.g., vertical and/or horizontal polarization orientation). For example, the MEMS infrared sensor could include a wire trace moving back and forth on a photosensitive table top. Such polarization sensitivity could provide that the infrared sensor can distinguish between objects in direct view of the infrared sensor (e.g., based on object light having a 50-50 polarization split) versus object light that has been reflected from a surface, which may have a non-50-50 polarization split. The infrared sensor could be configured to switch or adjust polarization orientation, could have polarization-sensitive pixels (per pixel), and/or have two or more cameras, each configured to detect different polarizations.

Many surfaces (e.g., brushed matte metal) that are not very reflective for wavelengths of light in the visible or near-infrared ranges can be highly reflective for light in the LWIR. LWIR light reflected from such surfaces can be detected with an infrared sensor with a resolution sufficient to distinguish between different types of target objects. In such scenarios, it becomes possible to effectively "see" between or behind other objects, such as parked cars or buildings (e.g., people walking out from between cars or out of alleyways). This feature improves based on the temperature contrast between the target object and the environment. The presently disclosed systems and methods provide an additional way to disambiguate target objects from within an environment. Furthermore, this technique can be relatively robust in inclement weather. Secondary uses could include, for example, occupancy detection/classification, classification between different types of cars, and to identify recently formed tracks (e.g., tire tracks, footprints, etc.).

II. Example Systems

Figure 1:
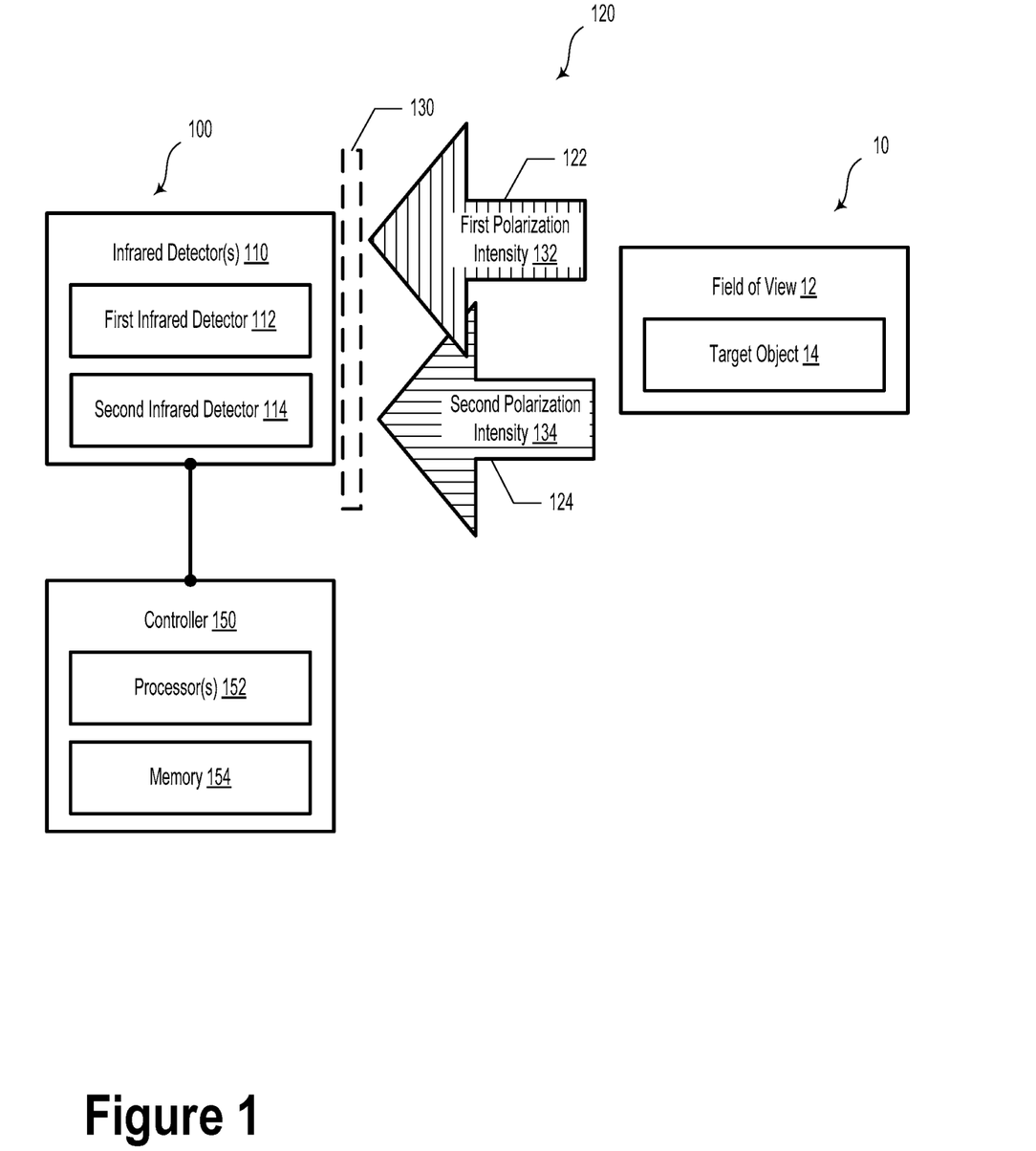
FIG. 1 illustrates a system, according to an example embodiment.

FIG. 1 illustrates a system 100, according to an example embodiment. System 100 includes at least one infrared detector 110. For example, the at least one infrared detector 110 could include at least one micro-electromechanical system (MEMS) infrared detector. The MEMS infrared detector could include a passive resistive element arranged in a linear meander (back and forth) shape along a material that is sensitive to infrared light. For example, the resistive element could include a wire trace arranged in a back and forth shape along a photosensitive substrate, or table top. It will be understood that other types of microbolometers and/or photodetectors sensitive to infrared light art contemplated.

As described herein, infrared light could include some or all of the range of the electromagnetic spectrum having wavelengths between about 700 nanometers and 1 millimeter. For example, infrared light described herein could refer to near-infrared (NIR) wavelengths (e.g., light having wavelengths between 750 and 1400 nanometers). Additionally or alternatively, infrared light could include the short-wavelength infrared (SWIR) wavelengths (e.g., light having wavelengths between 1.4 to 3 microns). Furthermore, additionally or alternatively, infrared light as described herein could include the mid-wavelength infrared (MWIR) wavelengths (e.g., light having wavelengths between 3 to 8 microns). Yet further, additionally or alternatively, infrared light could include the long-wavelength infrared (LWIR) wavelengths (e.g., light having wavelengths between 8 to 15 microns). Even further, additionally or alternatively, infrared light as described herein could include the very long-wavelength infrared (VLWIR) wavelengths (e.g., light having wavelengths between 12 to 30 microns). It will be understood that infrared detectors having various materials that are sensitive to such wavelengths of infrared light are all considered and possible within the context of the present disclosure.

In some embodiments, the at least one infrared detector 110 could be sensitive to one or more linear polarizations (e.g., vertical and/or horizontal polarization orientation) of infrared light.

In such scenarios, the at least one infrared detector 110 is configured to detect infrared light corresponding to a target object 14 within a field of view 12. In some embodiments, the field of view 12 could be defined by optical elements, such as lenses, mirrors, apertures, and the like. The field of view 12 could be part of an environment 10 of the system 100, such as a certain range of elevational angles, azimuthal angles, and/or distances. In embodiments, the infrared light includes at least one of a first polarization or a second polarization. For example, the infrared light 120 could include first polarization light 122 and second polarization light 124.

In some embodiments, the at least one infrared detector 110 could include a first infrared detector 112 configured to detect infrared light 120 having a first linear polarization (e.g., first polarization light 122). The at least one infrared detector 110 includes a second infrared detector 114 configured to detect infrared light 120 having a second linear polarization (e.g., second polarization light 124). In such embodiments, the first linear polarization and the second linear polarization could be perpendicular with respect to one another. While some embodiments describe a MEMS-type infrared detector, other polarization sensitive detectors are possible and contemplated within the context of the present disclosure. For example, polarization sensitivity can be achieved using tilted windows and/or dielectric stacks placed between the infrared detector and the light source. Other ways to adjust polarization-specific sensitivity of a photodetector (e.g., wire polarizer, polarization filters, etc.) are possible and contemplated.

It will be understood that a polarization of incoming light could be measured at angles of interest that are other than the vertical and horizontal directions. For example, the infrared sensor could be configured to measure light polarized at 45° with respect to the horizontal plane.

In some embodiments, the polarization angles of interest could be adjusted based on a context of a given scene. For example, a camera or other sensors (e.g., LIDAR or RADAR) could obtain information indicative of a context of a given scene. Based on the context of the scene, the polarization angles of interest could be selected and/or adjusted dynamically.

Additionally or alternatively, the polarization angles of interest could be selected or adjusted based on historical map data. Such historical map data could be obtained from prior camera images, or LIDAR/RADAR data.

In some embodiments, system 100 may include further optical elements 130, which could include, for example, one or more polarizers, mirrors, lenses, baffles, apertures, or other optical components. Other types of optical elements configured to adjust various properties of light (e.g., a linear polarization).

System 100 also includes a controller 150 having at least one processor 152 and at least one memory 154. Additionally or alternatively, the controller 150 may include at least one of a field-programmable gate array (FPGA) or an application-specific integrated circuit (ASIC). As an example, the one or more processors 152 may include a general-purpose processor or a special-purpose processor (e.g., digital signal processors, etc.). The one or more processors 152 may be configured to execute computer-readable program instructions that are stored in the memory 154. In some embodiments, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of system 100. The at least one processor 152 executes instructions stored in the at least one memory 154 so as to carry out operations.

The operations include receiving, from the at least one infrared detector 110, information indicative of infrared light 120 corresponding to the target object 14.

Figure 4:
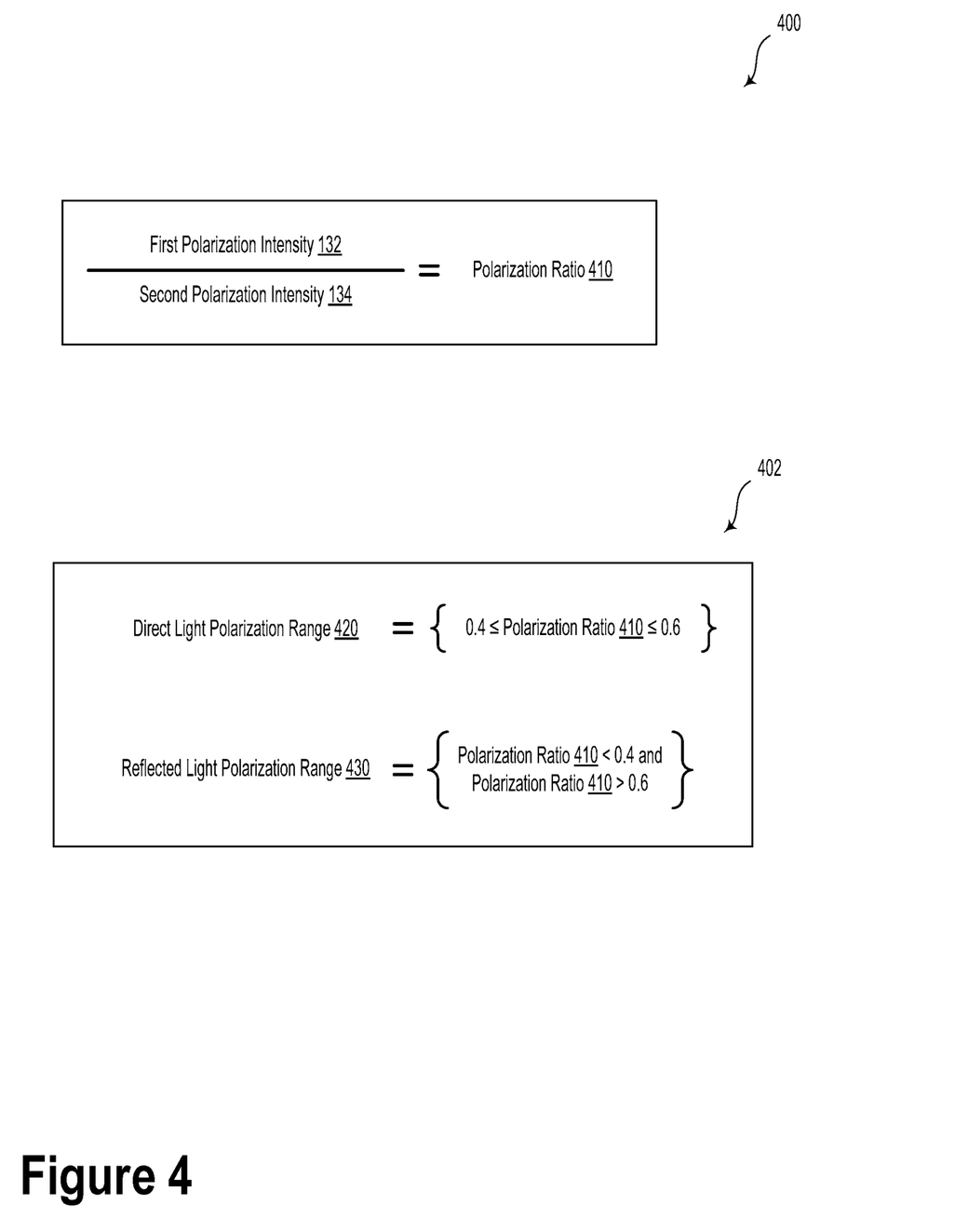
FIG. 4 illustrates various mathematical relationships, according to an example embodiment.
Figure 5A:
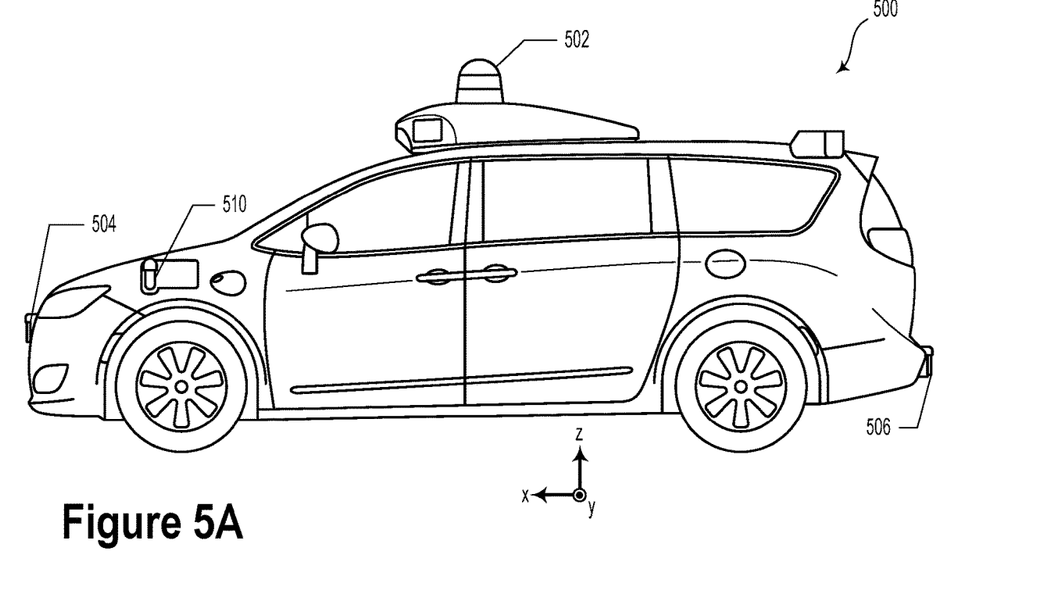
FIG. 5A illustrates a vehicle, according to an example embodiment.
Figure 5B:
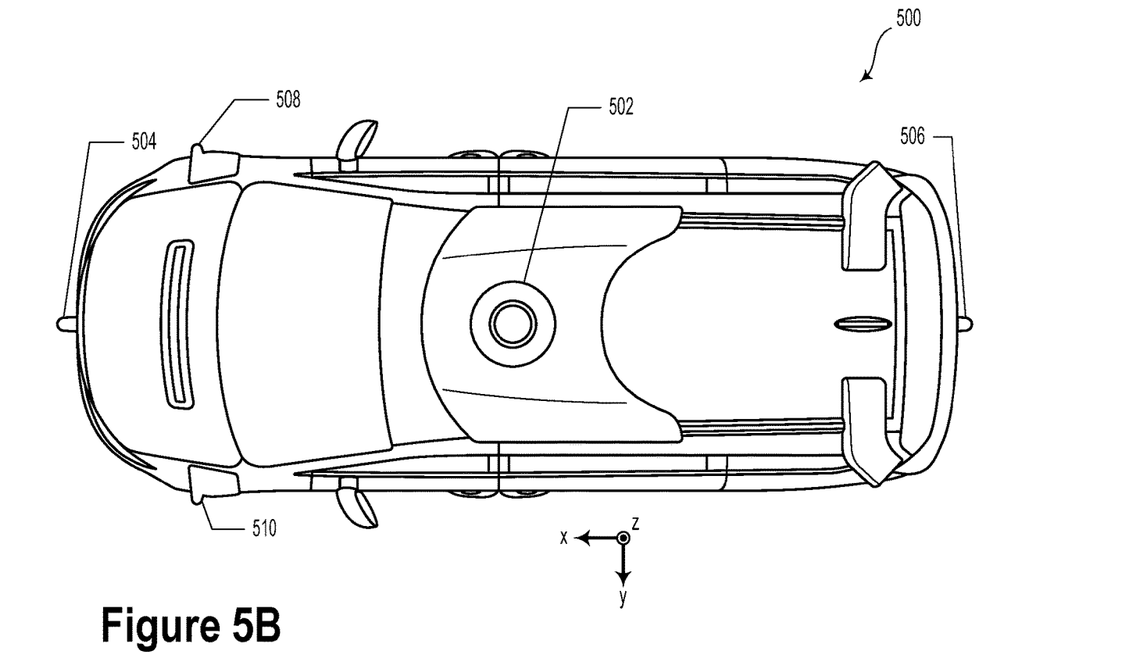
FIG. 5B illustrates a vehicle, according to an example embodiment.
Figure 5C:
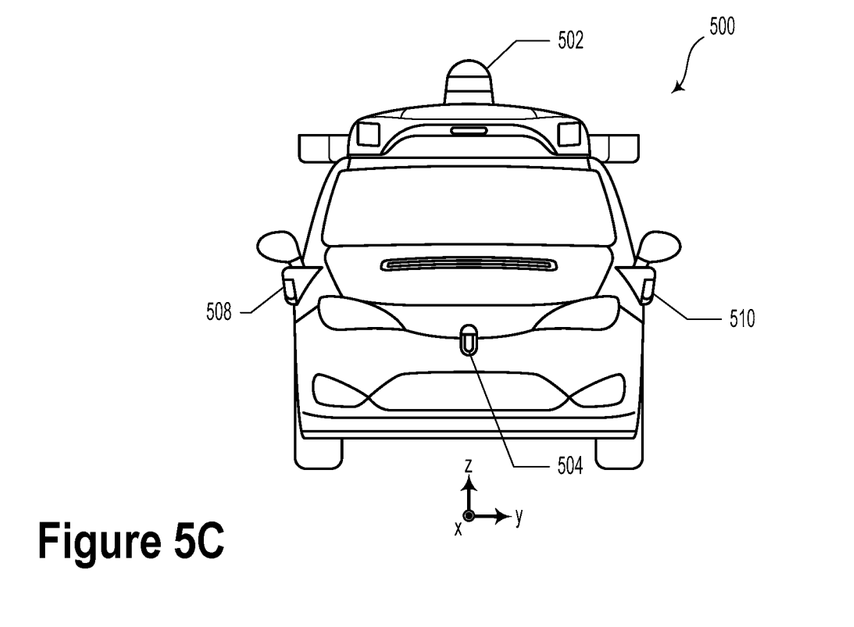
FIG. 5C illustrates a vehicle, according to an example embodiment.
Figure 5D:
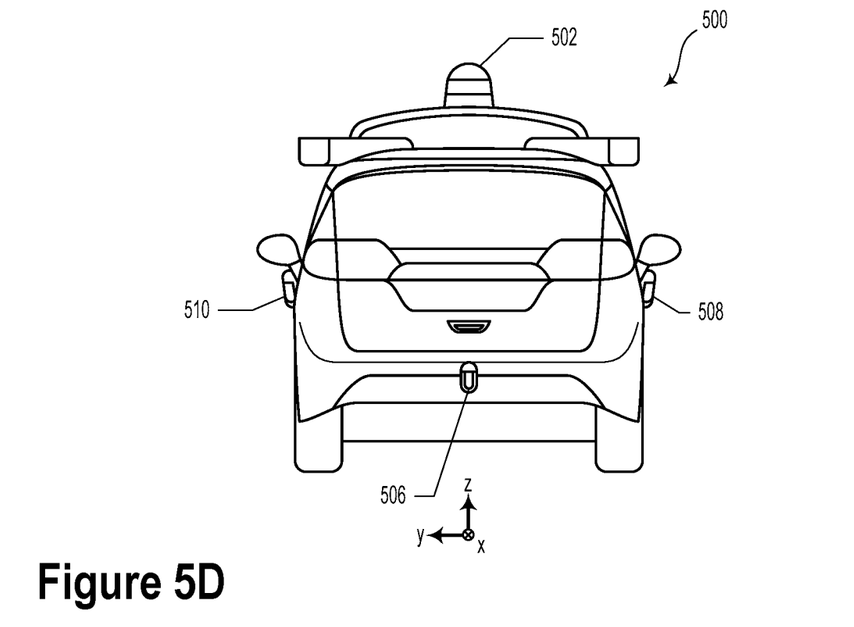
FIG. 5D illustrates a vehicle, according to an example embodiment.
Figure 5E:
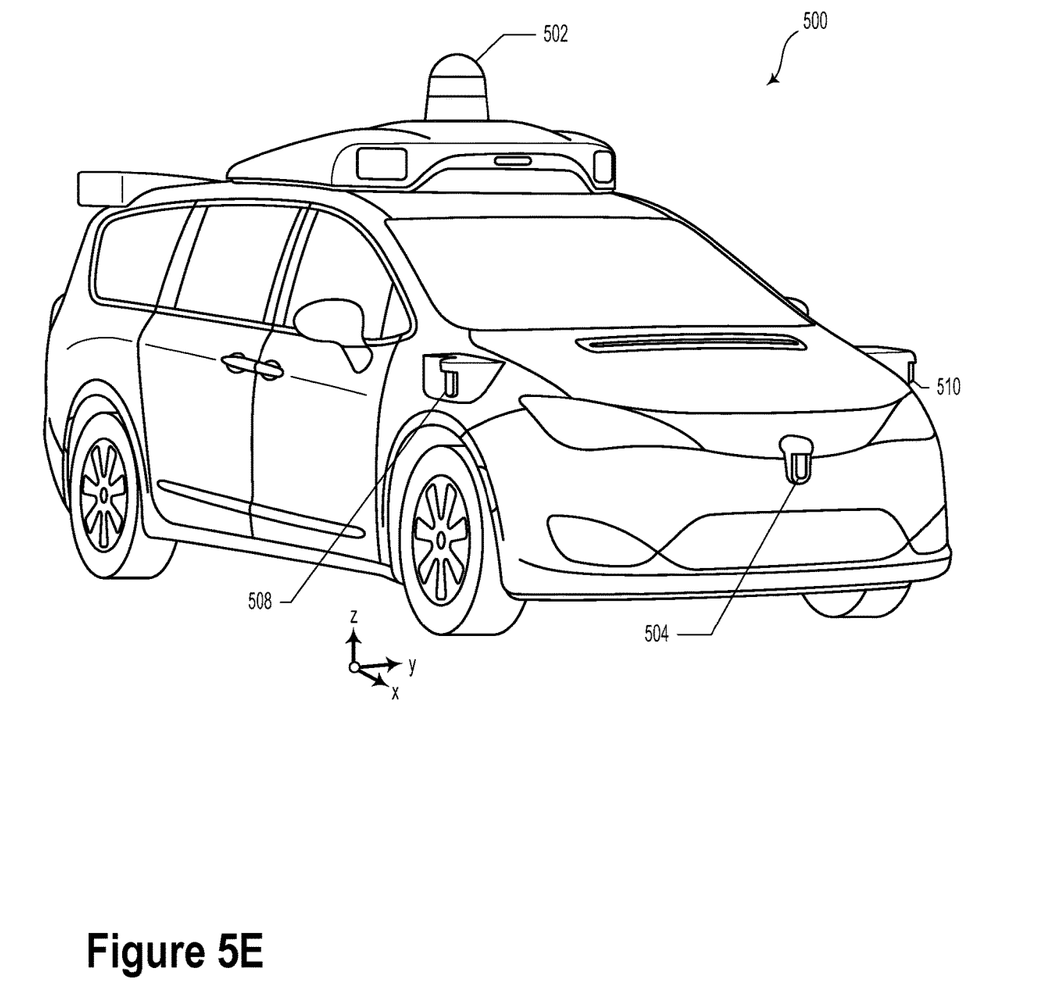
FIG. 5E illustrates a vehicle, according to an example embodiment.

The operations also include determining, based on the received information, a polarization ratio (e.g., polarization ratio 410 as illustrated and described in reference to FIG. 4) corresponding to the target object 14. In some embodiments, the polarization ratio could be defined and/or calculated as being a first polarization intensity 132 divided by a second polarization intensity 134.

In some embodiments, the first polarization intensity 132 could include an intensity of the infrared light having the first polarization (e.g., first polarization light 122). In such scenarios, the second polarization intensity 134 includes an intensity of the infrared light having the second polarization (e.g., second polarization light 124).

The operations also include determining, based on the polarization ratio, that the infrared light corresponding to the target object 14 includes direct light and/or reflected light. In such scenarios, determining that the infrared light includes direct light and/or reflected light could include determining that the polarization ratio is within a direct light polarization range. As an example, the direct light polarization range could be between 0.4 to 0.6. Other values for the limits of the direct light polarization range are contemplated and possible. For example, the direct light polarization range could be between 0.4 and 0.8 or between 0.45 and 0.55.

Additionally or alternatively, determining that the infrared light includes reflected light could include determining that the polarization ratio is within a reflected light polarization range. As an example, the reflected light polarization range could be from 0 to 0.4 and 0.6 to 1. Other values for the limits of the reflected light polarization range are contemplated and possible. In some embodiments, the reflected light polarization range could be the inverse of the direct light polarization range. However, in other embodiments, other types of ranges are contemplated and possible.

In some embodiments, determining that light is reflected light may provide the ability to normalize radiometric information about an object or reflective surface. For example, knowledge that light has been reflected off a given surface can be useful to calibrate or otherwise measure specific temperature information of that surface.

In some embodiments, the first polarization and the second polarization could be different linear light polarizations. Furthermore, the first polarization and the second polarization could be perpendicular linear light polarizations, as described in relation to FIG. 2.

In some embodiments, the operations could include determining, based on the received information, a target object type. In such scenarios, the target object type could include at least one of: an obstacle, a pedestrian, a bicyclist, a car, a truck, a motorcyclist, a static object, a moving object, a vehicle, a roadway, a sign, or a traffic light. Other target object types are possible and contemplated.

In some examples, the operations could include determining, based on the received information and the polarization ratio, a target object location.

In example embodiments, the operations could include receiving at least one of: LIDAR data, radar data, or camera data indicative of a reflective surface. In such scenarios, determining the target object location could be further based on a location of the reflective surface within an environment of the system 100. Furthermore, in some examples, determining that the infrared light corresponding to the target object includes reflected light could be further based on the LIDAR data, radar data, or camera data indicative of the reflective surface.

Figure 2:
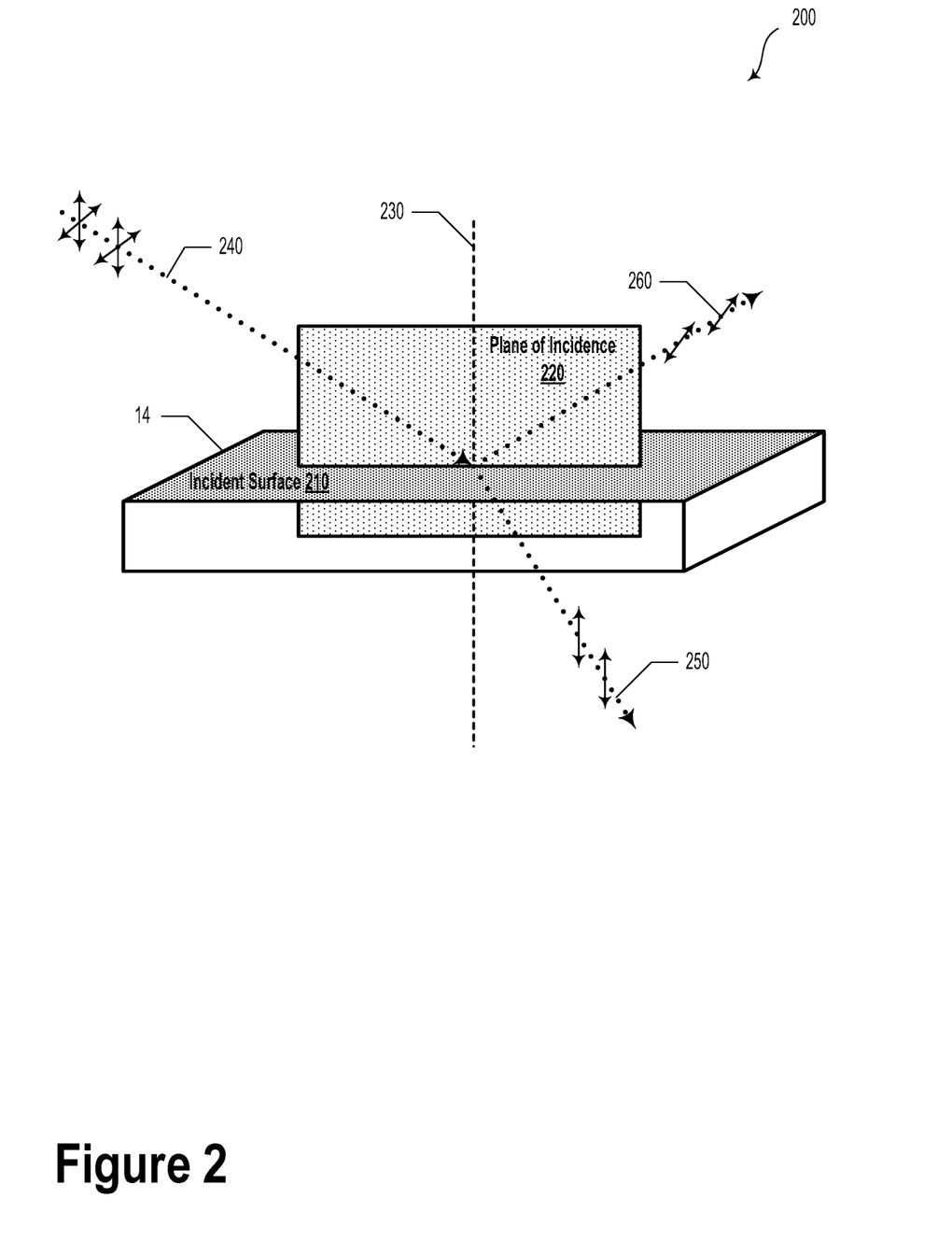
FIG. 2 illustrates a scenario, according to an example embodiment.

FIG. 2 illustrates a scenario 200, according to an example embodiment. Scenario 200 includes an incident surface 210, which could be a surface of target object 14. In such an example, incident light 240 could interact with the incident surface 210 along a plane of incidence 220.

In some examples, a first portion of the incident light 240 could be reflected from the incident surface 210 as s-polarized light 260. The s-polarized light 260 could include an electric field that is perpendicular to the plane of incidence 220. Additionally or alternatively, a second portion of the incident light 240 could be transmitted into or through the target object 14 as p-polarized light 250. The p-polarized light 250 could include an electric field that is parallel to the plane of incidence 220. By way of example, as described herein, the first polarization light 122 could be p-polarized light 250 and the second polarization light 124 could be s-polarized light 260, or vice versa. That is, alternatively, the first polarization light 122 could be s-polarized light 260 and the second polarization light 124 could be p-polarized light 250.

Figure 3A:
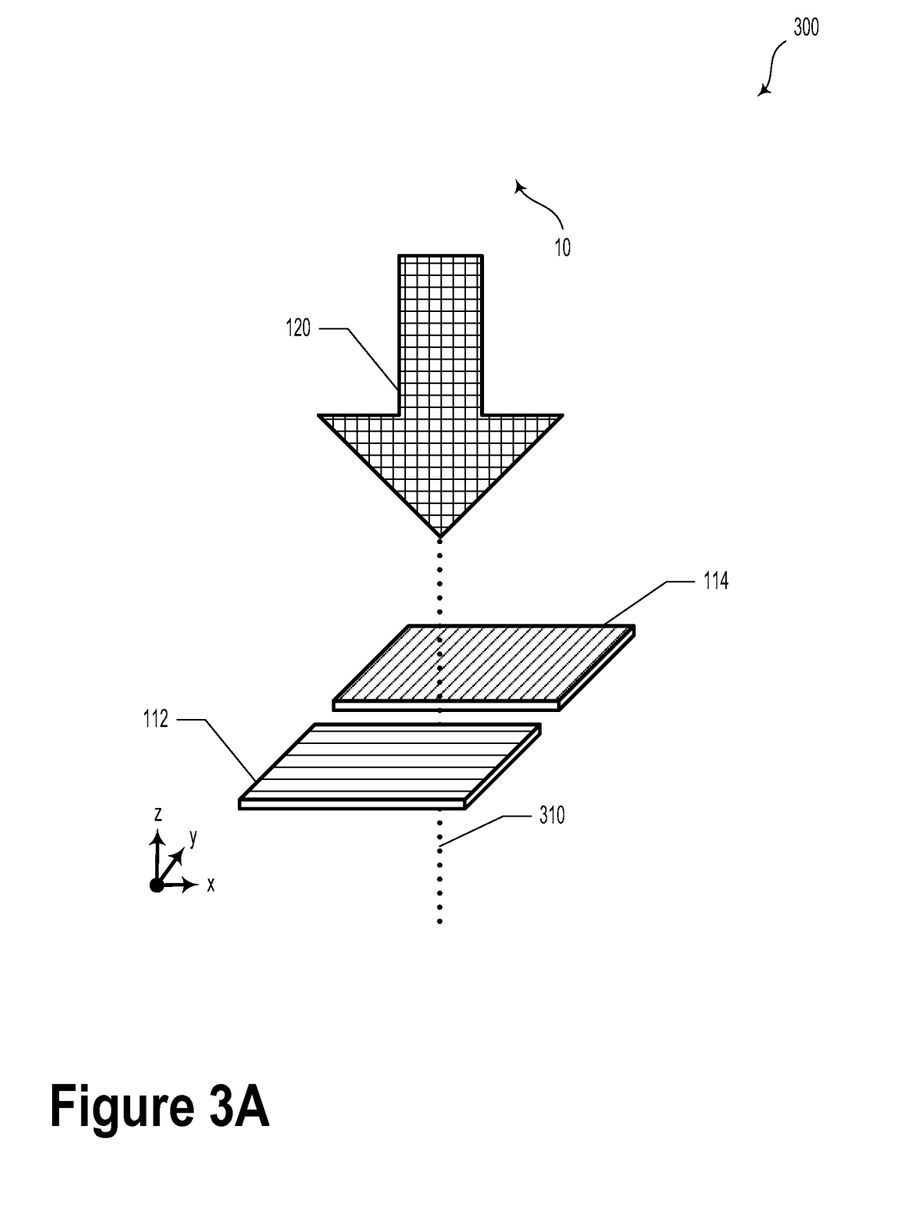
FIG. 3A illustrates a system, according to an example embodiment.

FIG. 3A illustrates a system 300, according to an example embodiment. System 300 may be similar to system 100 as illustrated and described in relation to FIG. 1. For example, system 300 illustrated infrared light 120 as being incident on a first infrared detector 112 and a second infrared detector 114. The first infrared detector 112 and the second infrared detector 114 could be wire-grid MEMS microbolometer devices, however other types of polarization-sensitive infrared detectors are possible and contemplated.

In some scenarios, the first infrared detector 112 may be configured to detect infrared light 120 having a first polarization. Furthermore, the second infrared detector 114 could be configured to detect infrared light 120 having an orthogonal polarization from that of the first infrared detector 112. For example, the first infrared detector 112 could be configured to detect p-polarized light while the second infrared detector 114 could be configured to detect s-polarized light, or vice versa.

Figure 3B:
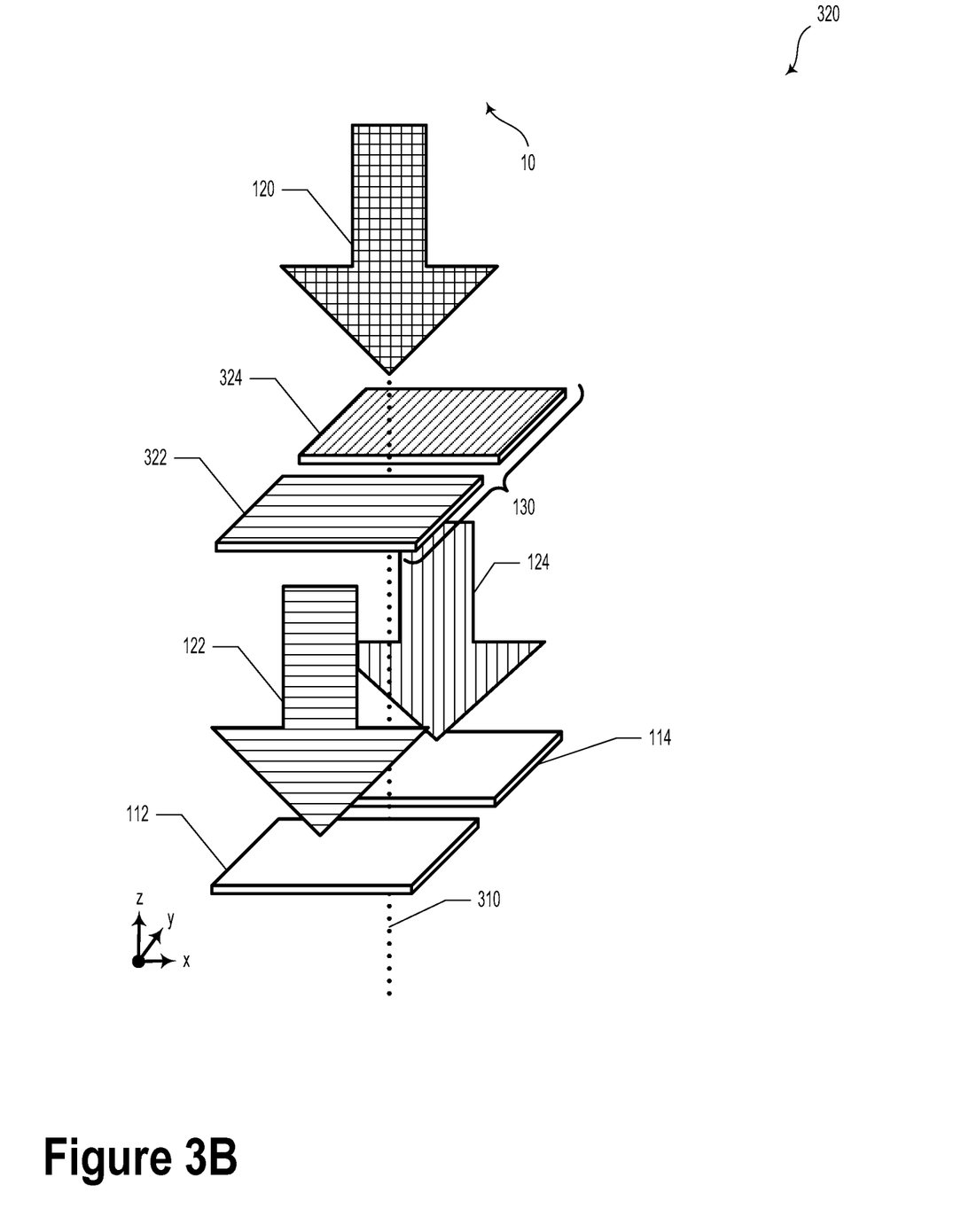
FIG. 3B illustrates a system, according to an example embodiment.

FIG. 3B illustrates a system 320, according to an example embodiment. System 320 may be similar to system 100 and system 300 as illustrated and described in relation to FIGS. 1 and 3A, respectively. For example, system 320 may include a first infrared detector 112 and a second infrared detector 114. In such a scenario, the first infrared detector 112 and the second infrared detector 114 need not be polarization sensitive, such as other infrared detectors described herein. Instead, further optical elements 130 could be arranged to provide differently-polarized light to the first infrared detector 112 and the second infrared detector 114. For example, a first polarizer 322 and a second polarizer 324 may be configured to transmit (or reflect) polarized light to the first infrared detector 112 and the second infrared detector 114, respectively.

In some embodiments, the first polarizer 322 could include a wire-grid polarizer or a dielectric stack-type polarizer. Other types of optical elements configured to transmit a single polarization of light while attenuating light with other polarizations are possible and contemplated.

FIG. 4 illustrates various mathematical relationships 400 and 402, according to an example embodiment. In some embodiments, mathematical relationship 400 could include finding a polarization ratio 410. In such scenarios, the polarization ratio 410 could be determined by dividing the first polarization intensity 132 by the second polarization intensity 134. Such calculations could be performed locally (e.g., by controller 150) or remotely (e.g., by a cloud server). Calculating the polarization ratio 410 may be performed on a pixel-by-pixel basis. Other ways to calculate the polarization ratio 410 are possible and contemplated.

Mathematical relationship 402 includes examples of a direct light polarization range 420 (e.g., 0.4<polarization intensity 410<0.6) and a reflected light polarization range 430 (e.g., polarization intensity 410<0.4 and polarization intensity 410>0.8). Other direct and reflected light polarization ranges are possible and contemplated.

III. Example Vehicles

FIGS. 5A, 5B, 5C, 5D, and 5E illustrate a vehicle 500, according to an example embodiment. In some embodiments, the vehicle 500 could be a semi- or fully-autonomous vehicle. While FIG. 5 illustrates vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include systems 100, 300 and/or 320 as illustrated and described in relation to FIGS. 1, 3A, and 3B. In other words, the systems described elsewhere herein could be coupled to the vehicle 500 and/or could be utilized in conjunction with various operations of the vehicle 500. As an example, the systems 100 and 300 could be utilized in self-driving or other types of navigation, planning, and/or mapping operations of the vehicle 500.

While the one or more sensor systems 502, 504, 506, 508, and 510 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

In some embodiments, the one or more sensor systems 502, 504, 506, 508, and 510 could include image sensors. Additionally or alternatively the one or more sensor systems 502, 504, 506, 508, and 510 could include LIDAR sensors. For example, the LIDAR sensors could include a plurality of light-emitter devices arranged over a range of angles with respect to a given plane (e.g., the x-y plane). For example, one or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

While LIDAR systems with single light-emitter devices are described and illustrated herein, LIDAR systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

While FIGS. 5A-5E illustrate various sensors attached to the vehicle 500, it will be understood that the vehicle 500 could incorporate other types of sensors.

In an example embodiment, vehicle 500 could include at least one infrared detector (e.g., at least one infrared detector 110). The at least one infrared detector is configured to detect infrared light (e.g., infrared light 120) corresponding to a target object 14 within a field of view 12. The field of view 12 is within an environment 10 of the vehicle 500. The infrared light includes at least one of a first polarization or a second polarization.

The vehicle 500 also includes a controller (e.g., controller 150), that has at least one processor and at least one memory. The at least one processor executes instructions stored in the at least one memory so as to carry out operations. The operations includes receiving, from the at least one infrared detector, information indicative of infrared light corresponding to the target object. The operations could also include determining, based on the received information, a polarization ratio corresponding to the target object. The polarization ratio is determined by dividing a first polarization intensity by a second polarization intensity.

Furthermore, the operations additionally include determining, based on the polarization ratio, that the infrared light corresponding to the target object, includes direct light or reflected light. In some embodiments, the determination of the polarization ratio could be performed by dividing the first polarization intensity by the second polarization intensity.

In some embodiments, the system 100 includes a rotatable mount. With such a rotatable mount, the at least one infrared detector could be re-positionable so as to move its field of view within an environment 10 and/or with respect to a yaw angle of the vehicle 500.

IV. Example Methods

Figure 6:
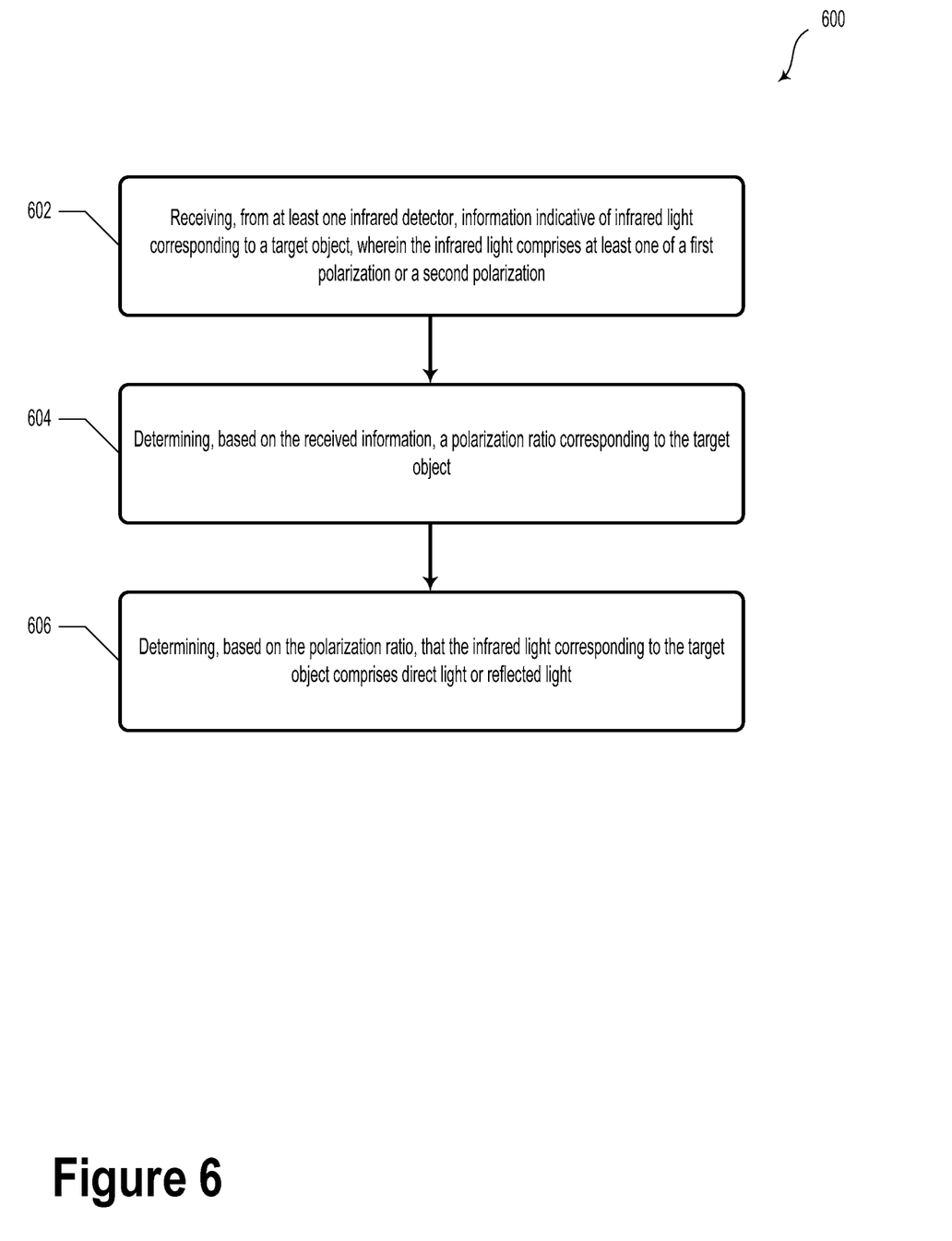
FIG. 6 illustrates a method, according to an example embodiment.

FIG. 6 illustrates a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may relate to elements of systems 100, 300 and 320 as illustrated and described in relation to FIGS. 1, 3A, and 3B. Additionally or alternatively, some or all of the blocks or steps of method 600 may relate to mathematical relationships as illustrated and described in relation to FIG. 4.

Block 602 includes receiving, from at least one infrared detector (e.g., infrared detectors 110), information indicative of infrared light corresponding to a target object (e.g., target object 14). In example embodiments, the infrared light could include at least one of a first polarization (e.g., first polarization light 122) or a second polarization (e.g., second polarization light 124).

Block 604 includes determining, based on the received information, a polarization ratio (e.g., polarization ratio 410) corresponding to the target object. In such scenarios, the polarization ratio could be defined as a first polarization intensity (e.g., first polarization intensity 132) divided by a second polarization intensity (e.g., second polarization intensity 134). Other ways to determine the polarization ratio are possible and contemplated.

In some embodiments, the first polarization intensity represents an intensity of the infrared light having the first polarization. In such scenarios, the second polarization intensity represents an intensity of the infrared light having the second polarization. In some embodiments, the first polarization and the second polarization could be different linear light polarizations.

As an example, the first polarization and second polarization could include orthogonal linear polarization states referred to as p- and s-polarization states, as illustrated and described with reference to FIG. 4. The p-polarized light could include an electric field polarized parallel to the plane of incidence and the s-polarized light could include an electric field perpendicular to the plane of incidence.

Block 606 includes determining, based on the polarization ratio, that the infrared light corresponding to the target object includes direct light and/or reflected light. In some embodiments, block 606 may include determining that the infrared light includes direct light if the polarization ratio is within a direct light polarization range. As an example, the direct light polarization range could be between 0.4 to 0.6. Additionally or alternatively, block 606 could include determining that the infrared light include reflected light if the polarization ratio is within a reflected light polarization range. In such scenarios, the reflected light polarization range could be 0 to 0.4 and 0.6 to 1. It will be understood that other direct light polarization and reflected light polarization ranges are possible and contemplated.

In some embodiments, method 600 could include determining, based on the received information, a target object type, wherein the target object type comprises at least one of: an obstacle, a pedestrian, a vehicle, a roadway, a sign, or a traffic light. Other target object types are possible and contemplated.

In some embodiments, method 600 could include receiving at least one of: LIDAR data, radar data, or camera data indicative of a location of a reflective surface. In such scenarios, the method 600 could also include determining a target object location based on the received information, the polarization ratio, and/or the location of the reflective surface.

Figure 7:
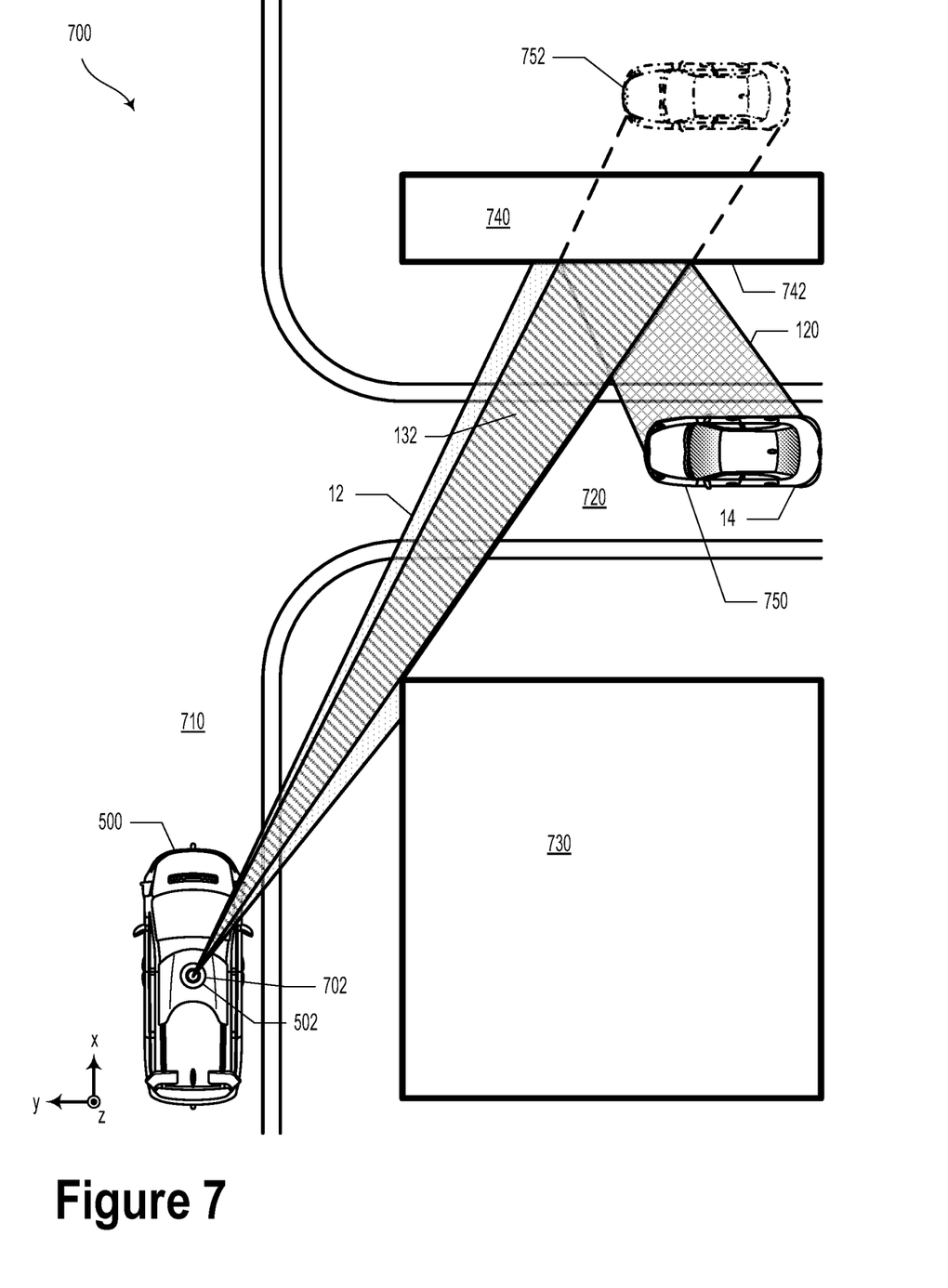
FIG. 7 illustrates a scenario, according to an example embodiment.

FIG. 7 illustrates a scenario 700, according to an example embodiment. In scenario 700, a vehicle 500 may have a sensor system 502 that could be similar or identical to systems 100, 300, and 320, as illustrated and described in reference to FIGS. 1, 3A, and 3B. Sensor system 502 could be mounted on a rotatable mount 702 so as to provide an adjustable field of view 12. That is, the rotatable mount 702 could be configured to adjust the field of view 12 of the sensor system 502 in yaw with respect to a direction of travel of the vehicle 500.

In scenario 700, the vehicle 500 could be traveling along a road 710 in the +x direction. A second vehicle 750 could be traveling in the +y direction along an alleyway 720. The second vehicle 750 could be obscured from direct line-of-sight of the sensor system 502 because of building 730. That is, building 730 could be blocking direct observation of the second vehicle 750 by the vehicle 500 and its sensor system 502.

However, as illustrated in FIG. 7, structure 740 could have a surface 742 that is at least partially reflective to infrared light 120, which could be emitted and/or reflected from the second vehicle 750. Upon emission from the second vehicle, the infrared light 120 could include a mixed polarization. However, upon interacting with the surface 742, one linear polarization of the infrared light 120 could be selected over a perpendicular linear polarization of the infrared light 120. In such scenarios, the light reflected from the surface 742 of structure 740 could be mostly polarized in a single direction (e.g., p-polarized or s-polarized). As an example, the light reflected from the surface 742 toward the sensor system 502 could be similar to the first polarization light 122, as described herein. Furthermore, the first polarization light 122 could have a relatively high intensity as compared to other polarizations of light.

In such a scenario, a camera system could be fooled or spoofed into interpreting the reflected infrared light signal as a virtual image 752 on the other side of the structure 740.

However, the systems, vehicles, and methods described herein could provide a way to disambiguate between the virtual image 752 and target object 14. For example, in scenario 700, if the first polarization light 122 has a high first polarization intensity 132 compared to that of the second polarization intensity 134, then the calculated polarization ratio 410 could be large (e.g., greater than 0.6). Accordingly, if the polarization ratio 410 is outside the direct light polarization range 420 and/or within the reflected light polarization range 430, the light from the second vehicle 750 could be classified as being reflected light. Accordingly, the vehicle 500 could be able to correctly perceive the second vehicle 750 as being in the alleyway (as opposed to on the other side of the structure 740).

While a second vehicle 750 is illustrated in scenario 700, it will be understood that other objects, structures, pedestrians, bicyclists, animals, obstacles, etc. could be better sensed, detected, perceived, or ascertained using polarization-based thermal detectors and photodetectors as described herein.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
    at least one infrared detector, wherein the at least one infrared detector is configured to detect infrared light corresponding to a target object within a field of view, wherein the field of view comprises an environment of the system, wherein the infrared light comprises at least one of a first polarization or a second polarization; and
    a controller comprising at least one processor and at least one memory, wherein the at least one processor executes instructions stored in the at least one memory so as to carry out operations, the operations comprising:
        receiving, from the at least one infrared detector, information indicative of infrared light corresponding to the target object;
        determining, based on the received information, a polarization ratio corresponding to the target object; and
        determining, based on the polarization ratio, that the infrared light corresponding to the target object comprises direct light or reflected light.

2. The system of claim 1, wherein determining the polarization ratio comprises dividing a first polarization intensity by a second polarization intensity, wherein the first polarization intensity comprises an intensity of the infrared light having the first polarization, and wherein the second polarization intensity comprises an intensity of the infrared light having the second polarization.

3. The system of claim 2, wherein the first polarization and the second polarization are different linear light polarizations.

4. The system of claim 2, wherein the first polarization and the second polarization are perpendicular linear light polarizations.

5. The system of claim 1, wherein the at least one infrared detector comprises at least one micro-electromechanical system (MEMS) infrared detector.

6. The system of claim 1, wherein the at least one infrared detector comprises:
    a first infrared detector configured to detect infrared light having a first linear polarization; and
    a second infrared detector configured to detect infrared light having a second linear polarization, wherein the first linear polarization and the second linear polarization are perpendicular with respect to one another.

7. The system of claim 1, wherein determining that the infrared light comprises direct light or reflected light comprises at least one of:
    determining that the infrared light comprises direct light if the polarization ratio is within a direct light polarization range; or
    determining that the infrared light comprises reflected light if the polarization ratio is within a reflected light polarization range.

8. The system of claim 7, wherein the direct light polarization range is 0.4 to 0.6, and wherein the reflected light polarization range is 0 to 0.4 and 0.6 to 1.

9. The system of claim 1, wherein the operations further comprise:
    determining, based on the received information, a target object type, wherein the target object type comprises at least one of: an obstacle, a pedestrian, a vehicle, a roadway, a sign, or a traffic light.

10. The system of claim 1, wherein the operations further comprise:
    determining, based on the received information and the polarization ratio, a target object location.

11. The system of claim 10, wherein the operations further comprise:
    receiving at least one of: LIDAR data, radar data, or camera data indicative of a reflective surface, wherein determining the target object location is further based on a location of the reflective surface.

12. The system of claim 11, wherein determining that the infrared light corresponding to the target object comprises reflected light is further based on the LIDAR data, radar data, or camera data indicative of the reflective surface.

13. A vehicle comprising:
at least one infrared detector, wherein the at least one infrared detector is configured to detect infrared light corresponding to a target object within a field of view, wherein the field of view comprises an environment of the vehicle, wherein the infrared light comprises at least one of a first polarization or a second polarization; and
a controller comprising at least one processor and at least one memory, wherein the at least one processor executes instructions stored in the at least one memory so as to carry out operations, the operations comprising:
receiving, from the at least one infrared detector, information indicative of infrared light corresponding to the target object;
determining, based on the received information, a polarization ratio corresponding to the target object; and
determining, based on the polarization ratio, that the infrared light corresponding to the target object comprises direct light or reflected light.

14. The vehicle of claim 13, wherein determining the polarization ratio comprises dividing a first polarization intensity by a second polarization intensity.

15. A method comprising
receiving, from at least one infrared detector, information indicative of infrared light corresponding to a target object, wherein the infrared light comprises at least one of a first polarization or a second polarization;
determining, based on the received information, a polarization ratio corresponding to the target object; and
determining, based on the polarization ratio, that the infrared light corresponding to the target object comprises direct light or reflected light.

16. The method of claim 15, wherein determining the polarization ratio comprises dividing a first polarization intensity by a second polarization intensity, wherein the first polarization intensity comprises an intensity of the infrared light having the first polarization, and wherein the second polarization intensity comprises an intensity of the infrared light having the second polarization, wherein the first polarization and the second polarization are different linear light polarizations.

17. The method of claim 15, wherein determining that the infrared light comprises direct light or reflected light comprises at least one of:
determining that the infrared light comprises direct light if the polarization ratio is within a direct light polarization range; or
determining that the infrared light comprises reflected light if the polarization ratio is within a reflected light polarization range.

18. The method of claim 17, wherein the direct light polarization range is 0.4 to 0.6, and wherein the reflected light polarization range is 0 to 0.4 and 0.6 to 1.

19. The method of claim 15, further comprising:
determining, based on the received information, a target object type, wherein the target object type comprises at least one of: an obstacle, a pedestrian, a vehicle, a roadway, a sign, or a traffic light.

20. The method of claim 15, further comprising:
receiving at least one of: LIDAR data, radar data, or camera data indicative of a location of a reflective surface; and
determining a target object location based on the received information, the polarization ratio, and the location of the reflective surface.

* * * * *